(12) United States Patent
Betz et al.

(10) Patent No.: US 7,350,611 B2
(45) Date of Patent: Apr. 1, 2008

(54) METHOD FOR CONTROLLING AN ELECTRIC DRIVE MACHINE

(75) Inventors: Michael Donald Betz, Knoxville, IL (US); Stephen Carl Garnett, Princeville, IL (US); Chih Chieh Liang, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 326 days.

(21) Appl. No.: 10/866,992

(22) Filed: Jun. 15, 2004

(65) Prior Publication Data

US 2005/0274555 A1    Dec. 15, 2005

(51) Int. Cl.
*G06F 19/00* (2006.01)
(52) U.S. Cl. .................. 180/69.3; 180/65.3; 180/65.4; 701/101; 701/102
(58) Field of Classification Search .............. 180/65.1, 180/65.3, 65.4, 69.3, 170; 701/101, 102, 701/50
See application file for complete search history.

(56) References Cited

U.S. PATENT DOCUMENTS

| | | | | |
|---|---|---|---|---|
| 5,070,959 | A | * | 12/1991 | Grabowski .................. 180/167 |
| 5,333,479 | A | | 8/1994 | Yamamoto et al. |
| 5,725,064 | A | | 3/1998 | Ibaraki et al. |
| 5,927,415 | A | | 7/1999 | Ibaraki et al. |
| 5,934,396 | A | | 8/1999 | Kurita et al. |
| 5,939,794 | A | | 8/1999 | Sakai et al. |
| 5,939,848 | A | | 8/1999 | Yano et al. |
| 6,053,842 | A | * | 4/2000 | Kitada et al. .................. 477/5 |
| 6,151,537 | A | | 11/2000 | Gheordunescu et al. |
| 6,208,925 | B1 | | 3/2001 | Creger et al. |
| 6,234,254 | B1 | | 5/2001 | Dietz et al. |
| 6,240,356 | B1 | * | 5/2001 | Lapke .......................... 701/93 |
| 6,249,733 | B1 | * | 6/2001 | Smith .......................... 701/50 |
| 6,314,347 | B1 | | 11/2001 | Kuroda et al. |
| 6,356,817 | B1 | | 3/2002 | Abe |
| 6,359,403 | B1 | * | 3/2002 | Pollklas et al. ............. 318/432 |
| 6,480,767 | B2 | | 11/2002 | Yamaguchi et al. |
| 6,484,830 | B1 | | 11/2002 | Gruenwald et al. |
| 6,553,302 | B2 | | 4/2003 | Goodnight et al. |
| 6,581,705 | B2 | | 6/2003 | Phillips et al. |
| 7,034,476 | B2 | * | 4/2006 | Wang et al. ................. 318/139 |
| 2001/0010276 | A1 | * | 8/2001 | Calamari et al. ........... 180/179 |
| 2003/0125860 | A1 | | 7/2003 | Rose et al. |
| 2006/0276948 | A1 | * | 12/2006 | Toda ........................... 701/50 |

* cited by examiner

*Primary Examiner*—Christopher P. Ellis
(74) *Attorney, Agent, or Firm*—Finnegan, Henderson, Farabow, Garrett & Dunner

(57) ABSTRACT

A method is provided for controlling an electric drive work machine including an engine and an electric motor that provides power to enable the work machine to travel across a surface terrain at certain ground speeds. In one embodiment, the method may include detecting a reverse directional shift of the work machine causing the work machine to travel in a reverse direction. Further, the method may include performing an engine speed reduction process that reduces a current speed of the engine based on the detected reverse directional shift without reducing a ground speed of the work machine while traveling in the reverse direction.

10 Claims, 5 Drawing Sheets

METHOD FOR CONTROLLING AN ELECTRIC DRIVE MACHINE

TECHNICAL FIELD

This invention relates generally to electric drive machines and more particularly, to systems and methods for controlling the engine speed of an electric drive work machine.

BACKGROUND

The increase in fossil fuel consumption coupled with the diminishing supply of these resources have given rise to the implementation of electric drive machines. These machines may be designed to provide combinations of electric and/or internal combustion power to the machines' drive train to reduce fuel consumption. In some configurations, an engine powers a generator, which provides electric power to a battery system and an electric motor. Typically, the electric motor is configured to drive the wheels or travel mechanisms of the work machine (e.g., sprockets on a track type tractor, etc.). Other types of electric drive machines allow both an engine and electric motor to provide power to the travel mechanisms of the work machine.

The evolution of electric drive machines have also given rise to new types of systems for controlling the power produced by the electric motor and/or engine. Typically, conventional control systems for electric drive machines use various machine operating conditions and parameters to adjust the operations of the machine's engine and/or electric motor in an attempt to increase the performance efficiency of the work machine.

Although conventional systems may control an engine in an electric drive machine, such control is based on anticipated changes to the work loads experienced by the vehicle. Accordingly, these systems may require extensive processing capabilities to determine the appropriate adjustments to be made to the operation of the engine to offset the loads experienced by the machine's motor. Such processing is sometimes not feasible in working environments where a work machine performs repeated motions that require many directional shifts and speed fluctuations. To reduce losses experienced by a work machine in such conditions, some control systems have been developed that take into account machine speed or directional fluctuations. One such system is described in U.S. Pat. No. 5,725,064 ("the '064 patent"), which uses a control system to cut off the fuel supply of an electric drive machine's engine when the machine is in reverse, when an auxiliary component is running during idle conditions, or when the motor is exclusively used to drive the machine. The control system in the '064 patent decompresses the engine following its shut down to reduce engine pumping losses. This reduces drag on the motor that may result from the shut down of the engine.

Although the system described in the '064 patent uses a control system to increase the efficiency of an electric drive machine, it does so in a manner requiring the engine to be shut down. Thus, the vehicle relies on the electric motor for mobility while in reverse. Further, the '064 patent, as well as other conventional electric drive control systems, do not consider overspeed limit conditions during directional shifts. Accordingly, there is a need for an electric drive control system that controls an engine based on directional shifts without complex processing or drastic mechanical changes in order to increase fuel efficiency and overspeed limit capabilities during certain directional shift conditions.

Methods, systems, and articles of manufacture consistent with the disclosed embodiments are directed to solving one or more of the problems set forth above.

SUMMARY

A method is provided for controlling an electric drive work machine including an engine and an electric motor that provides power to enable the work machine to travel across a surface terrain at certain ground speeds. In one embodiment, the method may include detecting a reverse directional shift of the work machine causing the work machine to travel in a reverse direction.

Further, the method may include performing an engine speed reduction process that reduces a current speed of the engine based on the detected reverse directional shift without reducing a ground speed of the work machine while traveling in the reverse direction.

In another embodiment, a system is provided for controlling an electric drive work machine. The system may include an engine, an electric motor that provides power to a travel mechanism that allows the work machine to travel across a terrain surface at certain ground speeds and an engine control system. The engine control system may be configured to determine when the work machine experiences a reverse directional shift causing the work machine to operate in a reverse direction. Based on the detected directional shift, the engine control system may send an engine control signal to the engine that reduces the speed of the engine from a current engine speed to an adjusted engine speed.

DETAILED DESCRIPTION

Reference will now be made in detail to certain embodiments, which are illustrated in the accompanying drawings. Wherever possible, the same reference numbers will be used throughout the drawings to refer to the same or like parts.

Figure 1A:
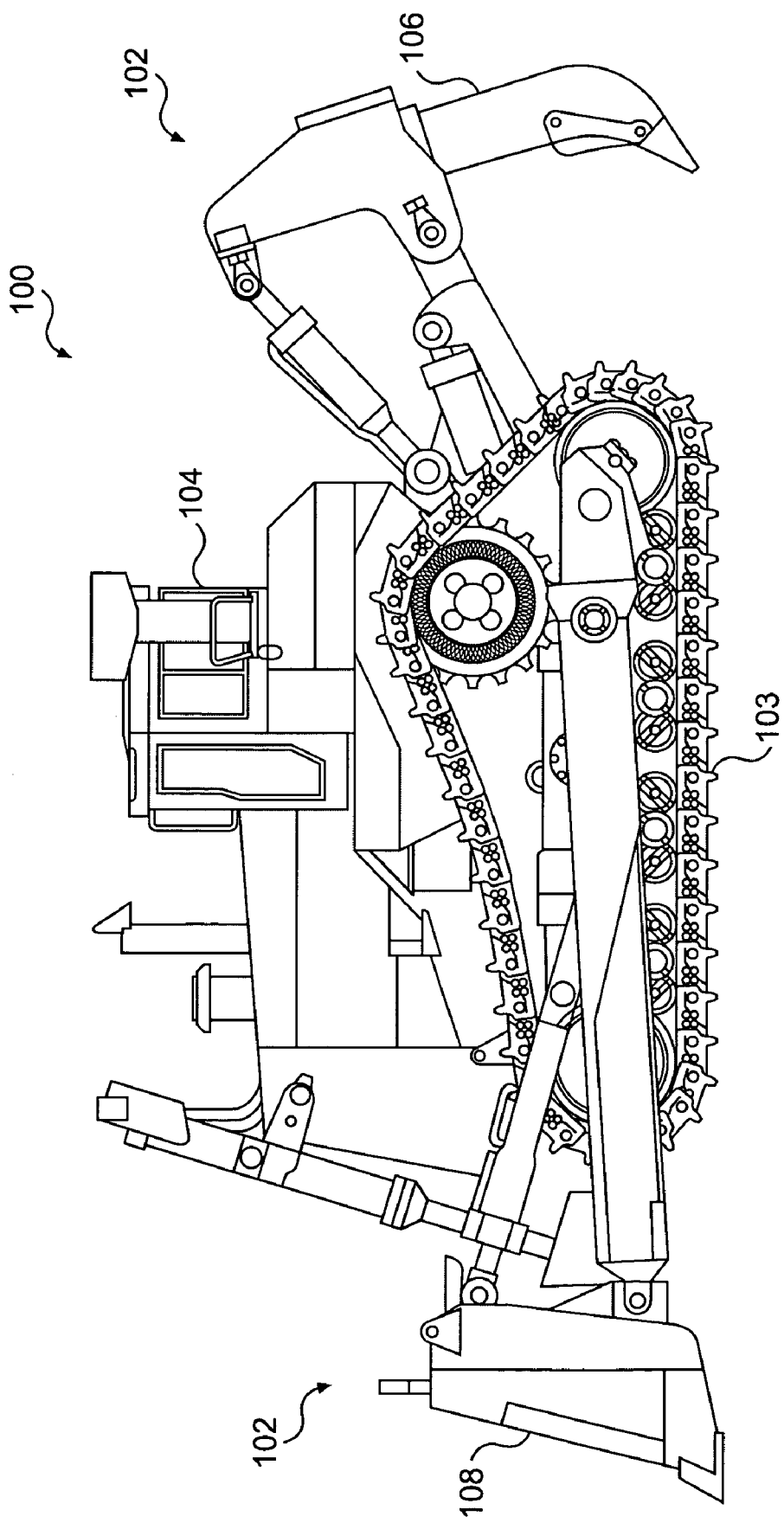
FIG. 1A illustrates a block diagram of an exemplary work machine consistent with certain disclosed embodiments.

FIG. 1A illustrates an exemplary work machine 100, shown as a track type work machine, equipped with work implements 102 and capable of performing various production operations, such as ripping, grading, and moving material. Work machine 100 may include an operator's cab 104 wherein an operator is positioned to operate work machine 100. Although work implements 102 are shown as being a ripper 106 and dozing blade 108, it should be understood that any type of work implements (e.g., dozer blades, buckets, forks, etc.) or none at all may be implemented and used by work machine 100. Work machine 100 may also include travel mechanisms, such as tracks 103, that engage the ground and is capable of operating in forward and reverse on level or sloped terrains.

Further, although work machine 100 is shown as a track type tractor machine, machine 100 may be any type mobile machine that performs at least one operation associated with a particular industry, such as mining, construction, farming, etc. and operates between or within work environments (e.g., construction site, mine site, power plant, etc.). Work machine 100 may also be a mobile machine for use in non-industrial settings (e.g., machines for personal use). For example, work machine 100 may represent a commercial machine, such as a truck, a crane, earth moving vehicle, a mining vehicle, a backhoe, material handling equipment, farming equipment, and other types of machines that operate in a commercial or industrial environment. In one embodiment, work machine 100 is an electric drive work machine that includes an electric motor that provides at least some power to a drive train of work machine 100.

Also, in accordance with certain embodiments, work machine 100 may be a machine that performs tasks that require repeated transitions from a forward and reverse direction while performing these tasks. For example, work machine 100 is depicted as a track type machine that may be used by an operator to manipulate material or terrain using work implements 102 by continuously moving machine 100 forward and backward during the course of the manipulations.

Figure 1B:
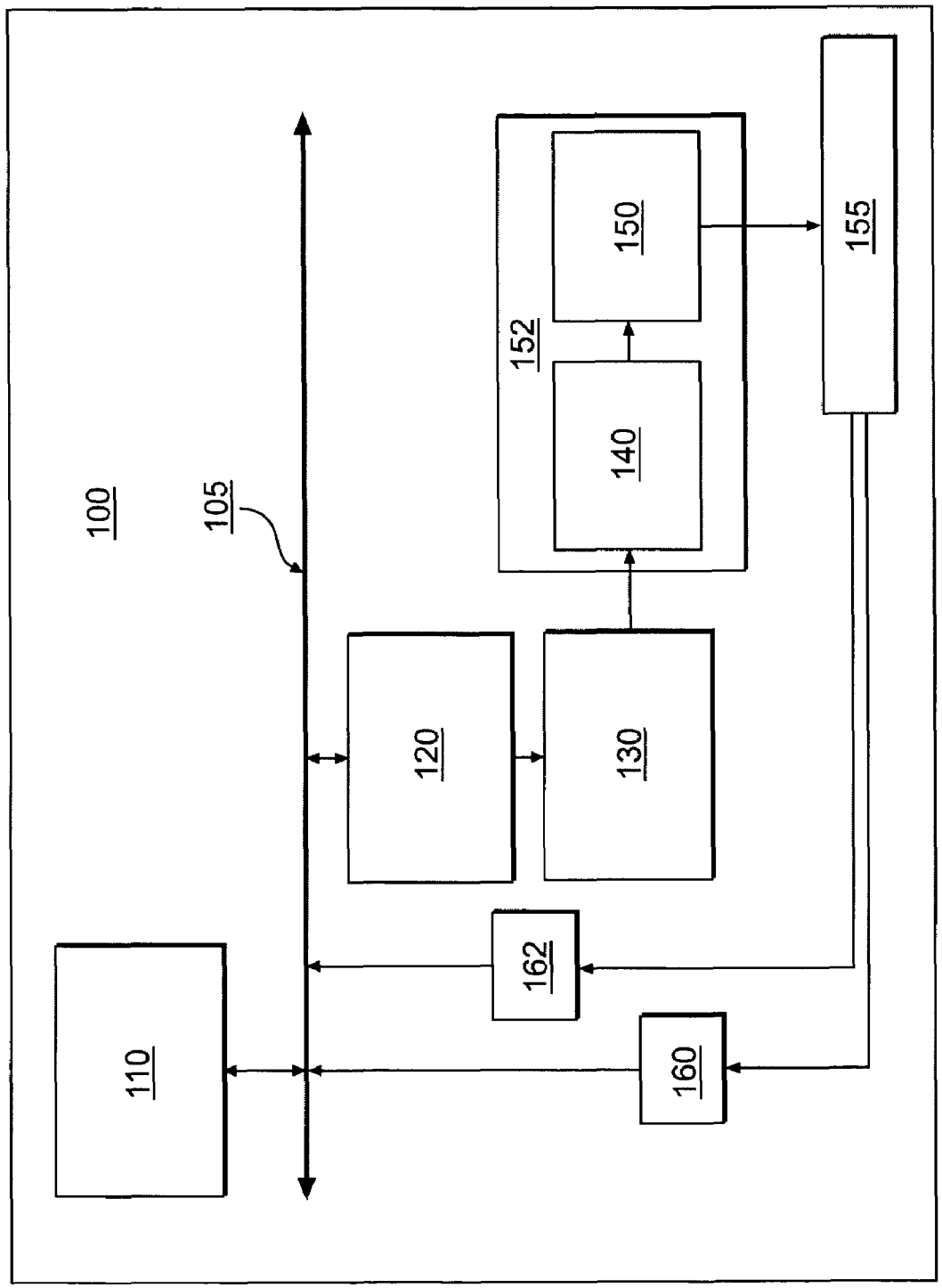
FIG. 1B illustrates a block diagram of an exemplary system that may be configured to perform certain functions consistent with disclosed embodiments.

FIG. 1B illustrates a block diagram of certain components of work machine 100 that may be configured to perform certain functions consistent with certain embodiments. As shown, work machine 100 may include at least an on-board data link 105, a work machine control system 110, an engine control system 120, an engine 130, a generator system 140, an electric motor 150, travel mechanism 155, and one or more sensors 160 and 162.

On-board data link 105 represents one or more proprietary and/or non-proprietary data links that interconnect modules included in work machine 100. In one embodiment, data link 105 may represent Society of Automotive Engineers (SAE) J1939, Controller Area Network (CAN), etc. standard data links.

Control system 110 represents one or more systems, devices, and/or mechanisms configured to perform certain control functions for work machine 100 and/or components of work machine 100. Control system 110 may be implemented by one or more hardware, software, and/or firmware components. In certain embodiments, control system 110 may be an Engine Control Unit (ECU) embedded in work machine 100, although other forms of control modules may be implemented. Control system 110 may receive sensor signals from one or more sensors within work machine 100 and produce commands for controlling one or more other elements of work machine 100, including other control systems.

Engine control system 120 represents one or more systems, devices, and/or mechanisms configured to perform certain control functions for work machine 100 and/or components of work machine 100, such as engine 130. Control system 120 may be implemented by one or more hardware, software, and or firmware components. In certain embodiments, control system 120 may be an ECU embedded in work machine 100, although other forms of control modules may be implemented. Control system 120 may receive signals and commands from control system 110. Based on these signals and commands, control system 120 may generate one or more signals for controlling the operations of engine 130.

Engine 130 represents an engine that provides power for work machine 100 and its components. Engine 130 may be a diesel engine (although other types of engines are contemplated) that generates and transfers power to other components of work machine 100 through a power transfer mechanism, such as a shaft.

Electric motor 150 represents a motor that transfers the electric power received from generator 140 into power that drives one or more ground travel mechanisms 155. Collectively, generator 140 and electric motor 150 may represent a drive train system 152 for work machine 100, although additional components (not shown) may be included in this system.

Ground travel mechanism 155 may represent one or more types of mechanical components that allow work machine 100 to travel on the surface of a type of terrain (i.e., earth surface terrain, subterranean surfaces, underwater surfaces, etc.). Such components may include wheels, axles, tracks, sprockets associated with tracks, etc. As work machine 100 travels on a terrain surface, one or more sensors 160 may measure, collect, and send speed signals to control system 110 reflective of the speed of the machine. Sensor 160 may send speed signals to control system 110 in response to a request from system 110, or sensor 160 may be configured to send the speed signals periodically or in response to a machine event, such as increase in speed, a deceleration event, etc. Further, work machine 100 may change directions while traveling. Sensor 162 may be a device that senses directional shifts of work machine 100 through various components, such as engine 130, a transmission system (not shown), travel mechanism 155, etc. Sensor 162 may be configured to send one or more directional shift signals to control system 110 directly or indirectly. Alternatively, or additionally, sensor 162 may send directional shift signals to engine control system 120 for subsequent processing.

Additionally, or alternatively, work machine 100 may sense directional shifts based on operator inputs associated with the direction of work machine 100. For example, if the operator changes the direction of machine 100 through operator inputs (e.g., forward or reverse directional mechanisms in the cab of machine 100), one or more signals indicative of this directional shift may be provided to control system 110 or a control system associated with drive train system 152. Further, work machine 100 may include a sensor that monitors the position of components within motor 150 that reflect the direction of work machine 100. The motor sensor may send these signals to control system 110 or a control system associated with drive train system 152 for determining the direction of work machine 100.

In another embodiment, sensor 162 may also include a sensor device that monitors and collects engine speed information from engine 130. Sensor 162 may send this information in the form of an engine speed signal to control system 110 and/or engine control system 120 for processing consistent with certain disclosed embodiments. Further, work machine 100 may include sensors that measure the rotational speed of an axle used in travel mechanism 155 that is proportional to the ground speed of machine 100 or similar sensors capable of measuring actual ground speed of work machine 100 through other components of work machine 100.

In certain embodiments, control system 110 sends one or more commands to one or more components of work machine 100 for controlling their operations. For example, control system 110 may send a command to control system 120 in response to signals sent or collected from sensors 160 and/or 162.

Figure 2:
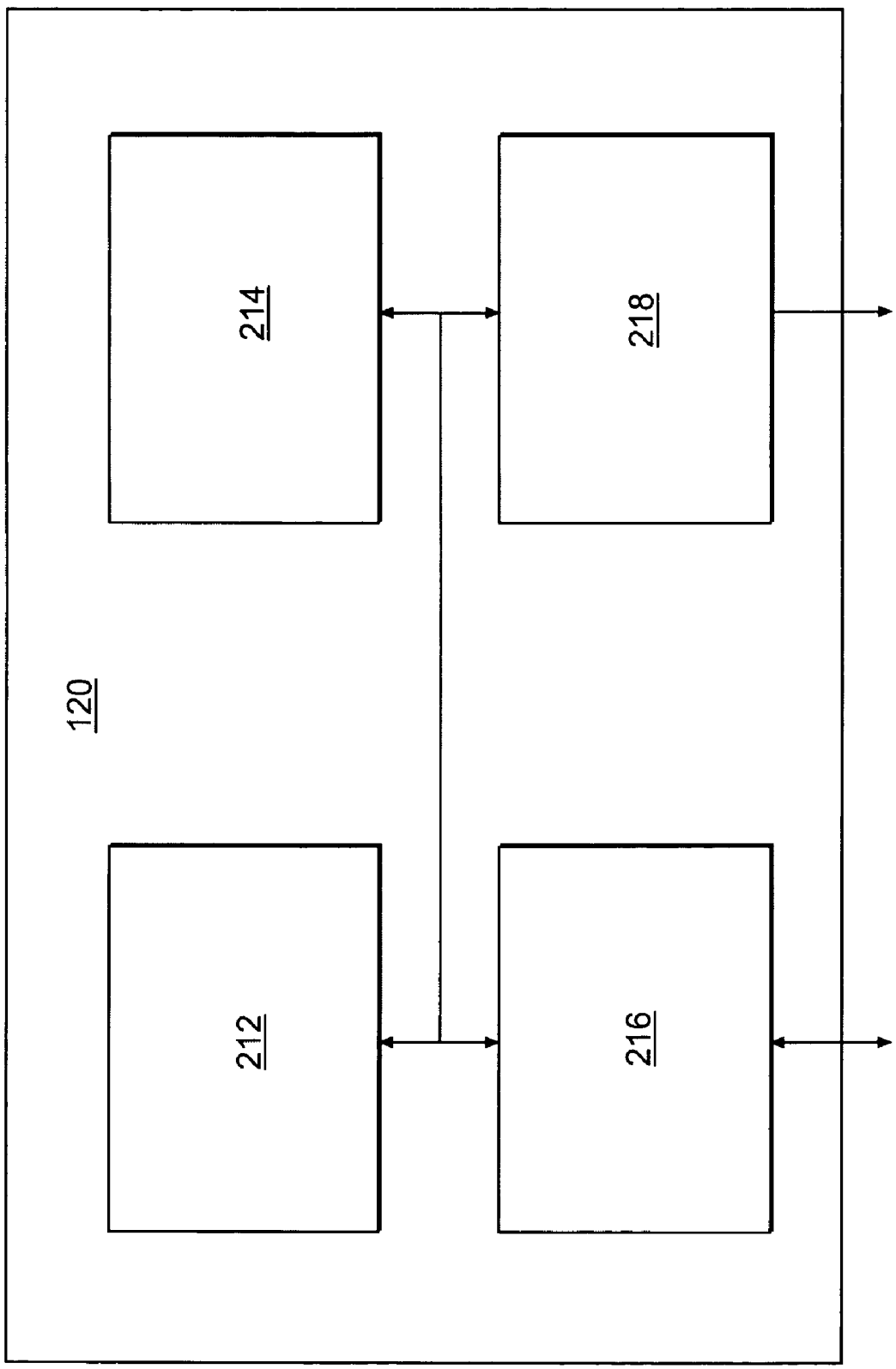
FIG. 2 illustrates a block diagram of an exemplary control system consistent with certain disclosed embodiments.

Engine control system 120 may be configured to perform standard engine control unit functions for work machine 100. Additionally, engine control system 120 may be configured to initiate and perform one or more engine control processes consistent with certain embodiments. FIG. 2 shows an exemplary engine control system 120 according to these embodiments. As shown, engine control system 120 may include a processing unit 212, a memory device 214, a sensor interface 216, and a control signal interface 218.

Processing unit 212 may represent one or more logic and/or processing components used by control system 120 to perform certain communications, control, and health test functionalities. For example, processor unit 212 may be configured for routing information among devices within and/or external to control system 120. Further, processing unit 212 may be configured to execute executing instructions from a storage device, such as memory 214. Although FIG. 2 illustrates a single processor unit, control system 120 may include a plurality of processor units, such as one or more general purpose processing units and/or special purpose processor units (e.g., ASICS). Processing unit 212 may also include, for example, one or more of the following: a co-processor, memory, registers, and other processing devices and systems as appropriate.

In certain embodiments, the functionality of processing unit 212 may be embodied within an integrated microprocessor or microcontroller. Such a microcontroller may, for example, include an integrated CPU, memory, and one or more peripherals. Depending on the implementation, engine control system 120 may include one or more microcontrollers in addition to or in place of processing unit 212 and memory 214, such as the Microchip's PIC, the 8051, Intel's 80196, and Motorola's 68HCxx series microcontrollers.

Memory 214 may represent one or more systems and/or mechanisms capable of storing information. Memory 214 may be embodied with a variety of components and/or subsystems, including a RAM (random access memory), a ROM (read-only memory), magnetic and optical storage elements, organic storage elements, audio disks, and video disks. In certain embodiments, memory 214 may include one or more programmable, erasable and/or re-useable storage components, such as EPROM (erasable programmable read-only memory) and EEPROM (erasable programmable read-only memory). Memory 214 may also include constantly-powered nonvolatile memory operable to be erased and programmed in blocks, such as flash memory (i.e., flash RAM). Memory 214 may provide a primary memory for processor 212, such as for storing program code. For example, memory 214 may include program code for communications, kernel and device drivers, configuration information, and other applications that might be embedded within control system 120. Although a single memory is shown, any number of memory devices may be included in control system 120, and each may be configured for performing distinct functions. In one embodiment, memory 214 may include program code that, when executed by processing unit 212, performs one or more engine control processes consistent with certain embodiments.

Sensor interface 216 may be an optional device that is configured to receive one or more sensor signals from one or more respective sensor devices (e.g., sensors 160, 162) that are associated with one or more corresponding components of work machine 100. In one embodiment, engine control system 120 extracts the signals received at sensor interface 216 and provides them to processing unit 212 and/or memory 214 for subsequent processing. Alternatively, engine control system 120 may receive sensor signals over a data link (e.g., data link 105) and data link interface 218.

Data link interface 218 may represent one or more interface devices that interconnect one or more data links (e.g., data link 105) with engine control system 120. Data link interface 218 may connect to proprietary and non-proprietary data links. In one embodiment, data link interface 218 may include virtual (i.e., software-based) ports that allow a single connection to act as if there were multiple connections.

Methods and system consistent with certain disclosed embodiments enable engine control system 120 to perform work machine control operations and processes. In one embodiment, work machine 100 may perform one or more processes that increase the performance efficiency of work machine 100 through direct or indirect affects to one or more of the machine's components, such as engine 130, motor 150, etc. For example, work machine 100 may adjust operations of engine 130 and/or other components, while traveling in certain directions, such as reverse.

During operation, work machine 100 may perform work related duties (e.g., traveling, hauling, moving earth, etc.) at various ground speeds, engine speeds, directions, etc. while manipulating various types of loads. In some instances, work machine 100 may perform cyclical work operations. For example, work machine 100 may repeatedly change directions and engine speeds while moving or hauling some type of load, such as when a track type tractor machine moves forward pushing a load (e.g., earth), backs up while experiencing little or no external loads, and moves forward again to push the load. This cyclical process may be repeated all day, or in some instances, all day and night, depending on the type of work performed by work machine 100 and/or the type of work environment work machine 100 may be operating. In one embodiment, work machine 100 may be configured to perform one or more control processes that take into account the directional shift, load, and/or engine speed changes work machine 100 may experience while performing such work related duties.

Figure 3:
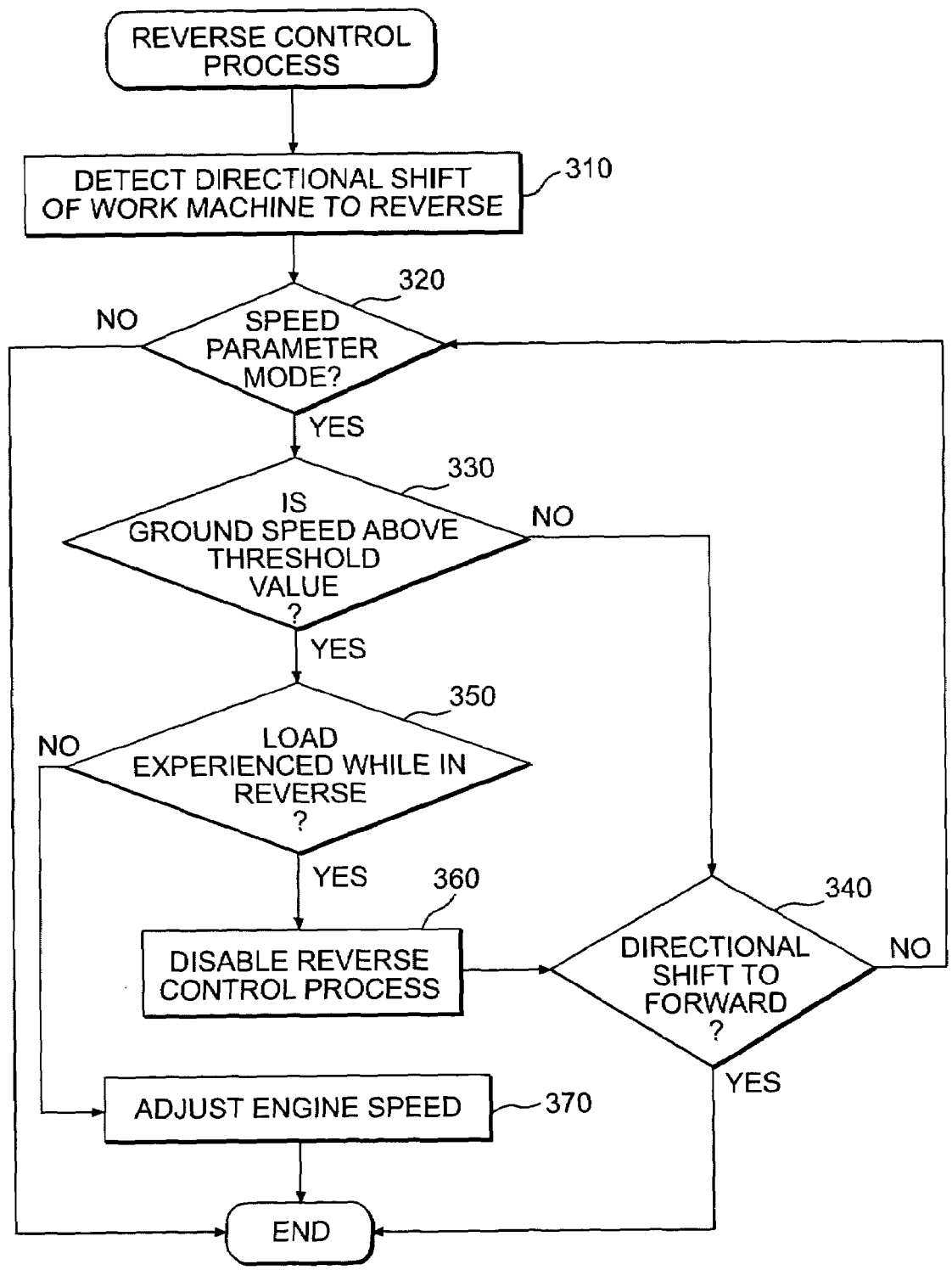
FIG. 3 illustrates a flowchart of an exemplary reverse control process consistent with certain disclosed embodiments.

FIG. 3 illustrates a flowchart of an exemplary reverse control process that may be performed by engine control system 120 and/or other elements of work machine 100. As mentioned above, work machine 100 may change directions many times while performing one or more tasks. Accordingly, in one embodiment, engine control system 120, control system 110, or other control systems (e.g., a control system associated with drive train system 152) may be configured to detect when work machine 100 experiences a directional shift to reverse (Step 310). To detect such a change, control system 110 may receive a directional shift signal from sensor 162 indicating that work machine 100 has shifted to a reverse direction or mode of operation causing a direction shift to a reverse direction. Sensor 162 may generate the directional shift signal based on information collected from travel mechanisms 155, such as the rotation of a sprocket changing direction, based on information collected from a transmission system (not shown), or based on user interface components that provides a signal reflecting that an operator has shifted the direction of work machine 100 to a reverse direction. The above examples are not intended to be limiting and other methods of detecting when work machine 100 has experienced a reverse directional shift may be implemented.

Once control system 110 receives the directional shift signal from sensor 162, it may generate and send a message to engine control system 120 over data link 105. The message may include information reflecting the directional shift. Alternatively, sensor 162 may send the directional shift signal to engine control system 120 directly (via sensor interface 216) or indirectly through data link 105 and data link interface 218. Once received, engine control system 120 may execute a reverse control program stored in memory 214. In one embodiment, the reverse control program may perform a process that determines whether engine control system 120 is configured in a speed parameter mode (Step 320). The speed parameter mode may be a mode of operation that allows engine control system 120 to make adjustments to the operations of engine 130 based on the speed of work machine 100 (e.g., mph) and/or the speed of engine 130 (e.g., RPM). If engine control system 120 is not configured in a speed parameter mode (Step 320; NO), the reverse control process continues at Step 370, described below. On the other hand, if engine control system 120 is configured in a speed parameter mode (Step 320; YES), system 120 may determine whether the ground speed of work machine 100 is above a predetermined threshold value while traveling in the reverse direction (Step 330).

In one embodiment, engine control system 120 may determine the ground speed of work machine through sensor 160. For example, as work machine travels across a terrain surface, sensor 160 may collect ground speed information from travel mechanism 155 indicating the ground speed. Sensor 160 may send this information to control system 110 for forwarding to engine control system 120 in the form of a message delivered over data link 105. Alternatively, sensor 160 may send a speed signal to engine control system 120 through sensor interface 216 or indirectly through data link interface 218. Work machine 100 may implement different techniques and components for determining ground speed. For example, in one embodiment, engine control system 120 (or control system 110) may be configured to request the speed sensor data from sensor 160 when it detects a directional shift, as performed in Step 310. Alternatively, ground speed may be determined through sensors that provide signals associated with the rotational speed of the torque converter system output shaft connected to drive train system 152.

Once the ground speed of work machine 100 is determined, engine control system 120 may compare this speed to a predetermined ground speed threshold value that is programmed in memory 214. The ground speed threshold value may be a value determined by a user, a computer executed program, or a combination of user and computer executed processes. Further, the ground speed threshold value may be based on one or more specifications associated with one or more components of work machine 100.

In one embodiment, the operator of work machine 100, or another user, may select a maximum or desired reverse ground speed prior to, or while, performing some task with machine 100. The operator or user may use a user interface component within machine 100 for selecting the desired ground speed value. The interface component may be analog or digitally-based and provides a mechanism for the user or operator to select and change a maximum reverse ground speed value for work machine 100. Once the maximum ground speed value is selected, work machine 100 may execute a computer process to determine the ground speed threshold value based on the value selected by the operator or user. In one embodiment, work machine 100 may determine the ground speed threshold value based on a percentage of the maximum ground speed value selected by the operator or user. Thus, if the maximum ground speed is selected as 7 mph, work machine 100 may determine the ground speed threshold value as a percentage of the 7 mph value, such as 80% or 5.6 mph.

The above ground speed values are exemplary only and not intended to be limiting. Work machine 100 may allow the maximum ground speed value and/or the percentage value used to determine the ground speed threshold value to be many different values. Further, disclosed embodiments may allow the ground speed threshold value to be determined based on other input values or signals. For instance, a user or operator may manually select the ground speed threshold value using an interface device within work machine 100. Further, the ground speed threshold value may be determined based on other types of values, such as engine speed values in RPM. Thus, a user or computer process may select a maximum engine speed using an interface device in work machine 100, and the ground speed threshold value may be determined based from the selected maximum engine speed value.

Returning to Step 330, if work machine 100 determines that the ground speed of work machine 100 does not exceed the threshold value (Step 330; NO), engine control system 120 may determine whether work machine 100 has experienced a directional shift to a forward direction (Step 340). Work machine 100 may employ various techniques and components for determining when a directional shift has occurred, such as those describe above in connection with Step 310. For example, signals indicative of operator input related to a manual change from a forward to reverse (or reverse to forward) direction may be provided to engine control system 120 or control system 110 to determine directional shifts. Alternatively, sensor signals from various components, such as motor 150 travel mechanism 155, etc., may reflect directional shifts. Control systems 120 or 110 may receive these sensor signals to detect the change in directional movement of machine 100.

If no forward directional shift is detected (Step 340; NO), the reverse control process continues at Step 320. If, however, a directional shift to a forward direction is detected (Step 340; YES), the reverse control process ends.

Alternatively, in place of or in addition to detecting directional shifts, the reverse control process may be terminated in Step 340 based on a certain ground speed value or a range of ground speed values of work machine 100. For example, as work machine 100 decelerates while traveling in reverse, a control system (e.g., system 110, 120, or a system associated with drive train system 152) may determine whether the ground speed of machine 100 has reached a certain value or is within a certain range of values. Based on this determination, work machine 100 may terminate the reverse control process. For instance, should work machine 100 reduce its ground speed while traveling in reverse below a certain value or within a range of values (e.g., 0.25 or 0 mph, or between 0.25 and 0 mph), machine 100 may determine that the machine may be approaching a directional shift condition, and thus terminates the reverse control process in anticipation of a directional shift to a forward direction. Additional or other methods of detecting directional shifts or determining conditions for terminating the reverse control process may be implemented by work machine 100.

Referring back to Step 330, if engine control system 120 determines that the ground speed of work machine 100 has exceeded the threshold value (Step 330; YES), system 120 may determine whether work machine 100 is experiencing a load while traveling in the reverse direction (Step 350). An experienced load may be associated with changes in external or internal conditions due to operations of work machine 100. For example, a load be experienced based on a change in gradient slope that work machine 100 may be traveling, such as a hill. Alternatively, or additionally, work machine 100 may experience a load by performing a certain task using one or more work elements 102 while traveling in a reverse direction, such as pushing, pulling, and carrying a load (e.g., earth, materials, etc.) using work elements 102. This is distinguished from a condition where work machine 100 is backing up on a level terrain, or without performing some type of extraneous work, such as hauling, dragging, pulling, etc. Based on these conditions, certain components of work machine 100 may perform operations that result in machine 100 experiencing a change in load. For instance, work machine 100 may experience steering loads from steering pumps, drawbar loads, and any other type of load that may take place as a result in terrain changes, modifications in the type of operations work machine 100 performs while traveling in reverse, and/or operations of one or more components within machine 100.

In certain embodiments, work machine 100 may detect a load using one or more sensors (not shown) that detect changes in slope of terrain, weight of work machine 100, angles of work components, such as a work element 102, and even increases in engine speed due to the work being performed. For instance, work machine 100 may be configured to detect when the speed of engine 130 drops or exceeds a predetermined value in RPM. Based on these detected changes in speed, work machine 100 may determine that machine 100 is experiencing a load. Alternatively, or additionally, work machine 100 may detect a load when the amount of fuel provided by the fuel supply system to engine 130 increases past a predetermined value or within a range of values. Other methods and systems may be implemented by work machine 100 to determine when a load occurs and the above examples are not intended to be limiting.

Returning to Step 350, if engine control system 120 determines that work machine 100 is not experiencing a load while backing up (Step 350; NO), the reverse control process continues at Step 370, described below. On the other hand, if a load is detected (Step 350; YES), engine control system 120 may be configured to disable the reverse control process to allow work machine 100 to deliver as much power (e.g., full power) required to handle the detected load (Step 360). In one embodiment, engine control system 120 may temporarily disable the reverse control process such that it determines whether a directional shift to a forward travel direction has occurred (Step 340). If so, the reverse control process ends. If forward directional shift is not detected, the reverse control process continues at Step 320.

As explained, if engine control system 120 determines no load is experienced while traveling in the reverse direction, the speed of engine 130 may be adjusted in a manner consistent with the disclosed embodiments (Step 370). For example, if engine control system 120 determines that the ground speed of work machine 100 is above the threshold value (e.g., 5 mph), system 120 may generate an engine control signal that reduces the speed of engine 130, thus reducing the amount of power produced by engine 130. In one embodiment, engine control system 120 may execute a program that determines the speed of which engine 130 should operate based on one or more parameters associated with work machine 100. For example, engine control system 120 may adjust the speed of engine 130 based on the current speed of engine 130, the current power produced by motor 150, the current ground speed of work machine 100, etc. Additionally, or alternatively, engine control system 120 may access a data structure stored in memory 214 (e.g., table, array, map, etc.) that includes data relationships between engine speed and these one or more other parameters. For instance, engine control system 120 may access a table stored in memory 214 that includes a performance map reflecting a data relationship between engine RPM to ground speeds, and a speed adjustment factor. Thus, for example, if engine 130 is running at 1950 RPM while work machine 100 is backing up at 6 mph, the map may indicate that the engine speed should be reduced to 1500 RPM, or by 450 RPM. Based on this information, engine control system 120 may generate an engine control signal that causes engine 130 to adjust its speed accordingly. Other methods and processes may be implemented by work machine 100 to adjust the operations of engine 130.

In one embodiment, work machine 100 may be configured to disengage or adjust the transfer of power from engine 130 to drive train 152 while performing the reverse control process. For example, work machine 100 may be configured to allow motor 150 to deliver the same amount, additional, or less, power to travel mechanism 155 when the speed of engine 130 is adjusted during the reverse control process. This enables work machine 100 to continue traveling at certain ground speeds (e.g., constant, increased, etc.) while reducing the speed of engine 130. Such features reduce the amount of heat loss experienced by work machine 100 because of these reduced engine speeds. Further, implementing the disclosed embodiments allow heat load sharing because higher heat load from motor 150 is mitigated with lower heat load from engine 130. Additionally, because engine 130 is operating at reduced speeds while in reverse, fuel consumption is reduced. Further, noise pollution may be reduced because of the reduced engine speed.

Also, the disclosed embodiments enable work machine 100 to improve its retarding performance because the reduced engine speed provides a greater potential to the engine overspeed limit during direction shift conditions. Overspeed limit is a value associated with the structural integrity of engine 130 and other components of work machine 100. In certain embodiments, the overspeed limit represents the maximum (or near maximum) engine speed work machine 100 can handle when experiencing a directional shift. For example, when work machine 100 changes direction, the resulting kinetic energy from decelerating work machine 100 will have to be absorbed, stored, or dissipated. Thus, the greater the difference between the engine speed and overspeed limit, the more kinetic energy engine 130 or other work machine 100 components can absorb when machine 100 experiences a directional shift to a forward direction. To better illustrate this concept, consider the following example. Work machine may be rated with an overspeed limit of 2500 RPM. Suppose, for example, that work machine 100 is traveling in a reverse direction while the engine speed is running at 2000 RPM. The difference between the overspeed limit (i.e., 2500 RPM) and the current engine speed (i.e., 2000 RPM) relates to an amount of kinetic energy work machine 100 or engine 130 can handle when the machine shifts to a forward direction (i.e., 500 RPM). Work machine 100 is able to increase the amount of kinetic energy by reducing the engine speed below 2000 rpm prior to the directional shift occurring.

Figure 4:
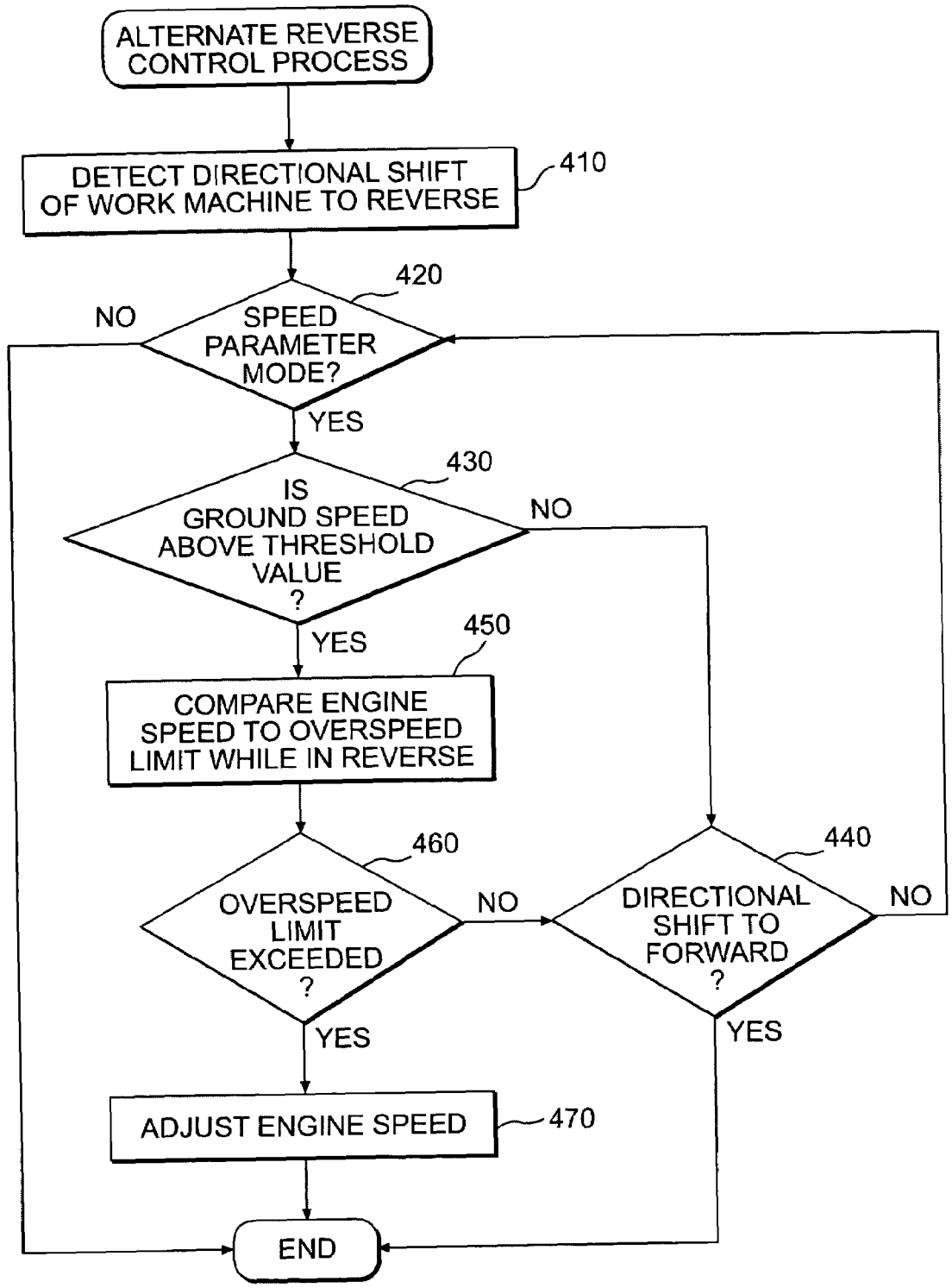
FIG. 4 illustrates a flowchart of another exemplary reverse control process consistent with certain disclosed embodiments.

FIG. 4 illustrates a flowchart of another exemplary reverse control process that takes overspeed limit into consideration. In this embodiment, engine control system 120 and/or control system 110 may be configured to detect when work machine 100 experiences a directional shift to reverse in a manner similar to that described in connection with Step 310 of FIG. 3 (Step 410). Based on a detected directional shift, engine control system 120 receives data reflecting the change in traveling direction of work machine 100.

Once such an indication is received, engine control system 120 may execute a reverse control program stored in memory 214. In one embodiment, the reverse control program may perform a process that determines whether engine control system 120 is configured in a speed parameter mode, similar to that described above with respect to Step 320 of FIG. 3 (Step 420). If engine control system 120 is not configured in a speed parameter mode (Step 420; NO), the reverse control process continues after Step 470, described below. On the other hand, if engine control system 120 is configured in a speed parameter mode (Step 420; YES), system 120 may determine whether the ground speed of work machine 100 is above a predetermined threshold value while traveling in the reverse direction in a manner similar to that described in connection with Step 330 of FIG. 3 (Step 430).

Once the ground speed of work machine 100 is determined, engine control system 120 may compare this speed to a predetermined ground speed threshold value that is programmed in memory 214. If the ground speed of work machine 100 does not exceed the threshold value (Step 430; NO), engine control system 120 may determine whether work machine 100 has experienced a directional shift to a forward direction (Step 440) in a manner similar to that described above in connection with Step 340 of FIG. 3. If no forward directional shift is detected (Step 440; NO), the reverse control process continues at Step 420. If, however, a directional shift to a forward direction is detected (Step 440; YES), the reverse control process ends.

Referring back to Step 430, if engine control system 120 determines that the ground speed of work machine 100 has exceeded the threshold value (Step 430; YES), system 120 may compare the current engine speed of engine 130 to an overspeed limit stored in memory 214 (Step 450). If the engine speed does not exceed, or is not within a predetermined range of, the overspeed limit (Step 460; NO), the alternate reverse control process continues at Step 440. On the other hand, if the engine speed exceeds, or is within a predetermined range of, the overspeed limit (Step 460; YES), engine control system 120 may adjust the speed of engine 130 in a manner similar to that described in connection with Step 370 of FIG. 3 (Step 470).

Thus, in certain embodiments, control system 120 may execute a process that determines the kinetic energy level of work machine 100 based on the overspeed limit and current engine speed of work machine 100. Using the determined kinetic energy, control system 120 may adjust the speed of engine 130 to meet the determined kinetic energy level prior to or during directional shifts of work machine 100.

INDUSTRIAL APPLICABILITY

In certain embodiments, an electric drive work machine may perform tasks that directional shifts to take place consistently over an extended period of time. For example, the work machine, such as a dozer or ripper type machine, may perform tasks that require the machine to repeatedly travel in reverse and forward while manipulating terrain or materials. Methods and systems consistent with the disclosed embodiments allow the work machine to increase its performance during these repeated reverse directional cycles. In certain embodiments, the work machine may selectively adjust the speed of its engine when it travels in a reverse direction. The work machine may be configured to use its electric motor to maintain the machine's ground speed while backing up and while the engine speed is reduced, thus increasing fuel economy, improving retarding performance, and reducing heat loss from the engine. In certain embodiments, the work machine may selectively disable certain features when the machine experiences loads while traveling in a reverse direction. Further, the work machine may be configured to adjust engine speeds based on overspeed limits associated with the work machine or its components.

Although the disclosed embodiments have been described with respect to reverse directional shifts, other types of directional shifts may be considered and implemented. For example, certain embodiments may be applied to directional shifts from reverse to a forward direction.

As described, engine control system 120 may be configured to disable the reverse control process when the work machine experiences a load while traveling in reverse. An example of such a load is when work machine 100 is backing up a sloped terrain surface. In such conditions, work machine 100 may be configured to maintain or reduce the ground speed of work machine through the power produced by motor 150. Further, when engine control system 120 determines that the speed of engine 130 may be reduced, the power provided by motor 150 may also be reduced based on one or more parameters associated with work machine 100 and/or the terrain surface on which the machine is traveling. For example, in situations where the terrain surface sloped downward, engine control system 120 may be configured to adjust the speed of engine 130 to reduce the amount of heat and power wasted when machine 100 backs down the declined slope. At the same time, in some embodiments, work machine 100 may be configured to reduce the power provided by motor 150 to reduce unnecessary heat losses while traveling in reverse.

The disclosed embodiments may be implemented in various environments and are not limited to work site environments. Other embodiments will be apparent to those skilled in the art from consideration of the specification and practice of the embodiments disclosed herein.

What is claimed is:

1. A system for controlling an electric drive work machine, comprising:
   an engine;
   an electric motor that provides power to a travel mechanism that allows the work machine to travel across a terrain surface at certain ground speeds;
   an engine control system that is configured to:
   determine when the work machine experiences a reverse directional shift causing the work machine to travel in a reverse direction,
   determine whether a ground speed of the work machine while traveling in the reverse direction is above a predetermined threshold value, and
   send an engine control signal to the engine that reduces the speed of the engine from a current engine speed to an adjusted engine speed based on the detected directional shift and when the ground speed of the work machine while traveling in the reverse direction is above the predetermined threshold value.

2. The system of claim 1, wherein the engine control system does not send the engine control signal to the engine when the work machine experiences a load event white traveling in the reverse direction.

3. The system of claim 2, wherein the load event represents at least one of (i) a condition where the work machine is manipulating a load while traveling in the reverse direction and (ii) a condition where the work machine is traversing a sloped terrain surface while traveling in the reverse direction.

4. The system of claim 3, wherein manipulating the load includes at least one of pulling a load, pushing a load, and carrying a load.

5. The system of claim 1, wherein the engine control system includes a memory device storing a performance map and the engine control system is configured to:

determine the adjusted engine speed based on information stored in the performance map.

6. The system of claim 1, wherein the engine control system is further configured to send the engine control signal when the work machine is not experiencing a load while traveling in the reverse direction.

7. The system of claim 6, wherein the experienced load is a load produced by the work machine performing at least one of:

pushing a load,
pulling a load, and
carrying a load.

8. The system of claim 6, wherein the experienced load is a load produced by the work machine traversing a sloped terrain surface while traveling in the reverse direction.

9. The system of claim 1, further including:

a sensor that generates a sensor signal reflecting when the work machine is experiencing the reverse directional shift, wherein the engine control system determines that the work machine is experiencing a reverse directional shift based on the sensor signal.

10. A system for controlling an electric drive work machine including an engine and an electric motor that provides power to enable the work machine to travel across a surface terrain at certain ground speeds, the system comprising:

means for detecting a reverse directional shift of the work machine causing the work machine to travel in a reverse direction;

means for determining whether a ground speed of the work machine while traveling in the reverse direction is above a predetermined threshold value; means for sending an engine control signal to the engine that reduces the speed of the engine from a current engine speed to an adjusted engine speed based on the detected directional shift and when the ground speed of the work machine while traveling in the reverse direction is above the predetermined threshold value; and means for performing an engine speed reduction process that reduces a current speed of the engine based on the detected reverse directional shift without reducing a ground speed of the work machine while traveling in the reverse direction.

* * * * *